M. SCHWERIN.

Assignor to G. M. BALLARD & G. MINCHIN.

Caster for Trunk.

No. 8,171. Reissued April 9, 1878.

Attest:

Oliver Drake

P. J. Inslee

Inventor.

M. Schwerin per

N. PETERS, PHOTO-LITHOGRAPHER, WASHINGTON, D. C.

UNITED STATES PATENT OFFICE.

MORRIS SCHWERIN, OF NEWARK, NEW JERSEY, ASSIGNOR TO GEORGE M. BALLARD AND GEORGE MINCHIN, OF SAME PLACE.

IMPROVEMENT IN CASTERS FOR TRUNKS.

Specification forming part of Letters Patent No. 108,193, dated October 11, 1870; Reissue No. 5,776, dated March 3, 1874; Reissue No. 8,171, dated April 9, 1878; application filed January 3, 1878.

*To all whom it may concern:*

Be it known that I, MORRIS SCHWERIN, of Newark, New Jersey, have invented an Improved Trunk-Caster Frame, of which the following is the specification:

This invention relates to certain improvements in trunk-casters, and their combination with the strengthening plates or straps usually secured to the bottom corners of a trunk.

My invention consists in clamping a non-rotating roller, substantially such as herein described, in a stationary position between the trunk and a supporting-strip, the latter being perforated to allow the ears of the frame to project through it.

It also consists in causing this perforated supporting-strip to bear against the ears, for the purpose of strengthening the same; and it further consists in the combination of the roller, the trunk, the recessed cleat, and perforated corner strap, all substantially as hereinafter set forth.

Figure 1:
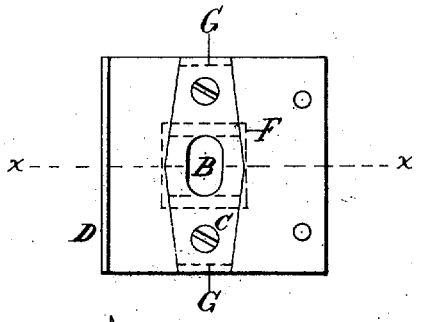
Figure 2:
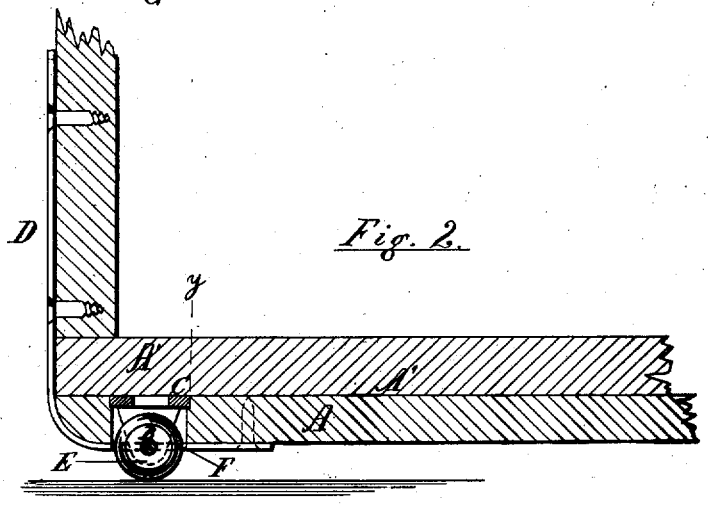

In the accompanying drawing, Figure 1 is a plan of the caster, with the independent strengthening-strap. Fig. 2 is a sectional view of the same, taken through line *x*, and showing the side and bottom and bottom cleat of a trunk; and Fig. 3 is a cross-section through line *y*.

Similar letters of reference indicate corresponding parts in each of the several figures.

A represents an ordinary cleat, such as is usually attached to the bottoms of trunks, chests, or boxes, and has an aperture made through it, as indicated in Fig. 2, through which the roller B passes when adjusted, as here shown. This roller is pivoted between two ears, E, which project downward from the plate or frame C. The ears E, which carry the roller, extend down below the bottom of the cleat and strengthening-plate D far enough to allow the trunk or box to be freely rolled about, while the upper part of the roller and the ears are inclosed within the cleat.

Figure 3:
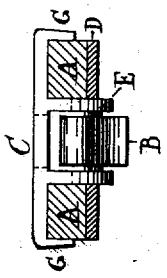

The top portion of the plate or frame C may extend entirely across the cleat, and have its two ends bent downward, as indicated in Fig. 3, so as to clasp the sides of the cleat, and thus prevent it from splitting. This extension of the frame, however, is not absolutely necessary.

The plate D not only serves to strengthen the corners of the trunk, but is so constructed and arranged with relation to the caster as that the sides of the aperture F, through which the roller passes, bear against the ends of the rivet upon which the roller turns, and so prevent it from working out, and at the same time greatly strengthen said caster.

I am aware that it is not new to embed the top of the roller in the bottom of a trunk, and I do not claim such feature, broadly.

I am also aware that revolving casters composed of two disks have been attached to the bottom of trunks by means of a recessed metallic plate, having shoulders to fit over the edges of the disks; but

What I claim, and desire to secure by Letters Patent, is—

1. The non-rotating frame of a caster, from which ears directly project, carrying a pivoted roller, clamped in a stationary position between the trunk and a supporting-strip, the latter being perforated to allow the passage through it of the caster-ears, substantially as set forth.

2. The frame of a caster clamped between the trunk and a supporting-strip, the latter being perforated, and bearing against the ears of the frame, substantially as described.

3. The combination of the recessed cleat, roller pivoted on a separate frame, and independent perforated corner strap, the parts being arranged for operation substantially as shown and described.

In testimony that I claim the foregoing I hereto affix my signature in presence of two witnesses.

M. SCHWERIN.

Witnesses:
OLIVER DRAKE,
P. J. INSLEE.